United States Patent [19]

Rausch

[11] 4,032,434

[45] * June 28, 1977

[54] CONVERSION OF HYDROCARBONS WITH A SUPERACTIVE ACIDIC BIMETALLIC CATALYTIC COMPOSITE

[75] Inventor: Richard E. Rausch, Mundelein, Ill.

[73] Assignee: UOP Inc., Des Plaines, Ill.

[*] Notice: The portion of the term of this patent subsequent to July 10, 1990, has been disclaimed.

[22] Filed: Jan. 19, 1976

[21] Appl. No.: 650,484

Related U.S. Application Data

[62] Division of Ser. No. 423,606, Dec. 10, 1973, Pat. No. 3,948,804.

[52] U.S. Cl. .............................. 208/139; 208/111; 260/668 A; 260/683.68; 260/683.9
[51] Int. Cl.² .................................... C10G 35/08
[58] Field of Search .................... 208/139, 111; 260/683.68, 683.9, 668 A

[56] References Cited

UNITED STATES PATENTS 3,745,112  7/1973  Rausch .......................... 208/139

Primary Examiner—C. Davis
Attorney, Agent, or Firm—James R. Hoatson, Jr.; Thomas K. McBride; William H. Page, II

[57] ABSTRACT

A superactive acidic bimetallic catalytic composite, comprising a combination of catalytically effective amounts of a platinum group component, a tin component and a computed amount of a halogen component with a porous carrier material, is disclosed. The platinum group and tin component are present in the composite in amounts, calculated on an elemental basis, of about 0.01 to about 2 wt. % platinum group metal and about 0.01 to about 5 wt. % tin. The amount of the halogen component is selected as a function of the surface area of the porous carrier material and of the moles of tin contained in the composite in accordance with a hereinafter disclosed relationship. Moreover, the tin component is uniformly dispersed throughout the porous carrier material in a particle size having a maximum dimension less than 100° A, substantially all of the platinum group component is present as the elemental metal and substantially all of the tin component is present in an oxidation state above that of the elemental metal. The principal utility of this superactive acidic bimetallic composite is in the conversion of hydrocarbons, particularly in the reforming of a gasoline fraction to produce a high octane and aromatic rich reformate. A specific example of the superactive acidic bimetallic catalyst disclosed is a combination of a platinum group metal, tin and chlorine with an alumina carrier material, wherein the tin component is uniformly dispersed throughout the alumina carrier material in a positive oxidation state and in a relatively small particle size and wherein the composite contains, on an elemental basis, about 0.01 to 2 wt. % platinum metal, about 0.01 to 5 wt. % tin and chlorine in an amount determined as a function of the surface area of the alumina and of the mole content of tin in accordance with an equation herein specified.

16 Claims, No Drawings

CONVERSION OF HYDROCARBONS WITH A SUPERACTIVE ACIDIC BIMETALLIC CATALYTIC COMPOSITE

CROSS-REFERENCE TO RELATED APPLICATIONS

This application is a division of my prior, copending application Ser. No. 423,606 filed Dec. 10, 1973, now U.S. Pat. No. 3,948,804. All of the teachings of this prior application are specifically incorporated herein by reference.

The subject of the present invention is a superactive bimetallic catalyst composite which has superior activity, selectivity, and resistance to deactivation characteristics when employed in a hydrocarbon conversion process that requires a catalyst having both a hydrogenation-dehydrogenation function and an acid function. More precisely, the present invention involves a superactive acidic bimetallic dual-function catalytic composite containing tin, platinum group metal and halogen on a high surface area support which catalyst maximizes the contribution of the halogen component by fixing the amount thereof as a function of two other parameters of the composite (i.e., the surface area of the support and the amount of tin contained therein). This composite also utilizes a catalytic component, tin, which traditionally has been thought of and taught to be an undesired ingredient of a platinum group metal-containing catalyst because of its close proximity to lead (a known poison for platinum) in the Periodic Table. In essence the present invention involves a combination of tin component and a uniquely computed amount of halogen component with a platinum group metal-containing catalyst in order to make a novel catalyst enabling substantial improvements in a hydrocarbon conversion processes of the type that have traditionally utilized a platinum metal-containing catalyst to accelerate the various hydrocarbon conversion reactions associated therewith. In another aspect this invention concerns the improved hydrocarbon conversion processes that are produced by the use of a superactive acidic, bimetallic catalytic composite comprising a combination of a platinum group component, a tin component and a computed amount of a halogen component with a porous, high surface area carrier material in a manner such that (1) the amount of the halogen component is selected as a function of surface area of the carrier material and of the amount of the tin component in accordance with a hereinafter specified quantitative relationship; (2) the tin component is uniformly dispersed throughout the porous carrier material in a relatively small particle size; and (3) the oxidation states of the metallic ingredients are carefully controlled so that substantially all of the platinum group component is present as the elemental metal and substantially all of the tin component is present in an oxidation state above that of the elemental metal and especially in the form of a tin halide or tin oxyhalide complex. In a specific aspect, the present invention concerns an improved reforming process which utilizes the disclosed superactive acidic bimetallic catalyst to markedly improve activity, selectivity and stability characteristics associated therewith, to increase yields of $C_5+$ reformate and of hydrogen recovered therefrom, to decrease the rate of production of deactivating coke deposits, to allow operation thereof at high severity conditions not heretofore generally employed in the art of continuous reforming processes and to markedly increase catalyst life before regeneration becomes necessary.

Composites having a hydrogenation-dehydrogenation function and a craking function are widely used today as catalysts in many industries, such as the petroleum and petrochemical industry, to accelerate a wide spectrum of hydrocarbon conversion reactions. Generally, the craking function is thought to be associated with an acid-acting material of the porous adsorptive, refractory oxide type which is typically utilized as the support or carrier for a heavy metal component such as the transition metals or compounds of Groups V through VII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins, and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters — obviously, the smaller rate implying the more stable catalyst. In a reforming process, for example, activity commonly refers to the amount of conversion that takes place for a given charge stock at a specified severity level and is typically measured by octane number of the $C_5+$ product stream; selectivity usually refers to the relative amount of $C_5+$ yield that is obtained at a particular activity or severity level; and stability is typically equated to the rate of change with time of activity, as measured by octane number of $C_5+$ product and of selectivity, as measured by $C_5+$ yield. Actually, the last statement is not strictly correct because generally a continuous reforming process is run to produce a constant octane $C_5+$ product with the severity level being continously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of formation of these carbonaceous materials on the catalyst. Viewed in terms of performance parameters, the problem is to develop a dual-function catalyst having superior activity, selectivity, and stability. In particular, for a reforming process run to make a constant octane $C_5+$ product the problem is typically expressed in terms of shifting and stabilizing the $C_5+$ yield-reactor temperature relationship — $C_5+$ yield being representative of selectivity and reactor temperature being proportional to activity when all other operating conditions are maintained the same.

In my U.S. Pat. No. 3,740,328 I disclosed by finding regarding a dual-function, bimetallic catalytic composite which possesses improved activity, selectivity and stability characteristics when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, oligomerization, hydrodealkylation, transalkylation, cyclization, dehydrocyclization, cracking, hydrocracking, reforming, polymerization, halogenation, and the like processes. In particular, I disclosed that the use of a bimetallic catalytic composite comprising a combination of a platinum group component, a halogen component and a tin component with a porous refractory carrier material can enable the performance of a hydrocarbon conversion process which has traditionally utilized a dual-function catalyst to be substantially improved. In my U.S. Pat. No. 3,745,112, I reported on my finding that this type of bimetallic catalyst can be materially and significantly improved if the amounts of the metallic components, their oxidation states and the distribution thereof in the catalytic composite are carefully controlled in the manner indicated therein. More specifically, I disclosed in this second patent the precise conditions, structural modifications and limitations that enable a substantial improvement in the performance of a platinum group metal-tin bimetallic catalyst when it is utilized in the conversion of hydrocarbons. As reported therein, one essential condition associated with the acquisition of this improved interaction of tin with platinum group metal is the particle size of the tin component; my findings here indicated that it is essential to carefully control the particle size of the tin component so that it is less than 100° A in maximum dimension (i.e., average diameter). Another condition for achieving an improved interaction of tin with the platinum group metal-containing catalyst is the distribution of the tin component in the porous carrier material with which it is combined; my finding here was that it is essential that the tin component be uniformly dispersed throughout the porous carrier material (i.e. its concentration is approximately the same in any divisable portion of the carrier). Yet another condition for this improved performance is associated with the oxidation state of the metallic components in the finished catalyst; my finding here was that best results are obtained when substantially all of the platinum group component is present as the elemental metal and when substantially all of the tin component is present in an oxidation state above that of the elemental metal (e.g. as tin oxide, halide, oxyhalide, and the like).

Against this background, the starting point for the present invention was the substantially improved bimetallic catalyst disclosed in my second-mentioned patent. In my work with this catalyst, I have now found that a further significant improvement in its performance characteristics in a hydrocarbon conversion process can be achieved if the amount of halogen contained therein is carefully controlled to meet the requirements of two separate functions of the halogen component of this catalyst. More specifically, as a result of my investigation of the interaction of the halogen component with a platinum group metal-tin bimetallic catalyst, I have now discerned that there are two separate mechanisms for the interaction of halogen with the catalyst and that the needs of both of these mechanisms of interaction must be satisfied in order to maximize the activity characteristics of this catalyst with no sacrifice in selectivity and stability characteristics. Without the intention of limiting the scope of my invention by this explanation, I believe that there are two separate kinds of halogen sites in this catalyst and that optimum performance is obtained when sufficient halogen is provided to activate both of these modes of halogen interaction. One type of halogen site is ascribed to the traditional interaction of halogen with reactive constituents (such as bound hydroxyl groups) of the porous carrier material in order to form a halide complex on the surface of the carrier material. My finding with regard to this first mechanism of halogen addition is that the amount of halogen necessary for these sites is predominantly a function of the surface area of the carrier material. On the other hand, I have now discovered that there is a second mechanism for halogen substitution in the case of a platinum-tin bimetallic catalyst and I attribute this second mode of interaction to the formation of a tin halide or tin oxyhalide complex in the catalyst. Furthermore, I have ascertained that it is necessary to provide sufficient halogen to satisfy both modes of halogen acquisition and that this second mode only comes into play after the requirements of the first mode are satisfied. My finding with regard to this second mode is that the amount of halogen required for it is a strong function of the moles of tin contained in the catalyst. The long and the short of the present invention is then that I have determined that if the amount of halogen contained in a platinum-tin bimetallic catalyst is set as a function of the surface area of the carrier material and of the moles of tin contained therein according to a hereinafter specified equation a further substantial improvement in performance is realized. This further improved catalyst having a computed halogen content is referred to herein as a superactive, acidic platinum group metal-tin bimetallic catalyst.

In the case of a reforming process, one of the principal advantages associated with the use of this superactive, acidic bimetallic catalyst involves the acquisition of the capability to substantially increase the activity of the catalyst at no sacrifice in stability or selectivity, thereby enabling a significant decrease in the severity level necessary to make required octane. This decrease in severity level necessary to make octane can in turn be used to decrease catalyst loading, increase catalyst life, increase throughput of charge stock, increase octane number of $C_5+$ reformate product, decrease plant pressure to increase $C_5+$ yield, decrease hydrogen circulation rate or any combination of these. In any case the catalyst of the present invention provides a markedly more active catalyst having excellent selectivity and stability characteristics which can be used according to any of the techniques known in hydrocarbon conversion art to take advantage of these highly beneficial properties.

It is, accordingly, one object of the present invention to provide a hydrocarbon conversion catalyst having superior performance characteristics, particularly activity, when utilized in a hydrocarbon conversion process. A second object is to provide a highly active bimetallic catalyst having dual-function hydrocarbon conversion performance characteristics that are relatively insensitive to the deposition of hydrocarbonaceous material thereon. A third object is to provide preferred methods of preparation of this catalytic composite which insures the achievement and maintenance of its properties. Another object is to provide an improved reforming catalyst having superior activity, selectivity and stability when employed in a low pressure reforming process. Yet another object is to provide an improvement in activity characteristics of a dual-function hydrocarbon conversion catalyst which utilizes a relatively inexpensive component, tin, to promote and stabilize a platinum group component. Still another object is to provide a method of preparation of a tin-platinum catalyst which insures that the tin component is in a highly dispersed and halogenated state during use in the conversion of hydrocarbons.

In one embodiment, the present invention is a superactive, acidic bimetallic catalytic composite comprising a combination of a platinum group component, a computed amount of halogen component, and a tin component with a porous carrier material. The platinum group and tin components are present in this composite in amounts sufficient to result in the composite containing, on an elemental basis, about 0.01 to about 2 wt.% platinum group metal and about 0.01 to about 5 wt.% tin. Futhermore, the tin component is uniformly distributed throughout the porous carrier material in a particle size having a maximum dimension of less than 100° A, and the oxidation states of the metallic ingredients are carefully adjusted to result in a composite having substantially all of the platinum group component present as the elemental metal and substantially all of the tin component present in an oxidation state above that of the elemental metal. In addition, the computed amount of the halogen component, on an elemental basis, is determined according to the following equation:

$$\text{wt.\% halogen} = (K_1)(SA) + (K_2)(K_3)(M_{Sn})$$

where
$K_1$ is about 0.004 to about 0.006 wt. % halogen/$M^2$/g
$K_2$ is about 3 to about 5 atoms of halogen/atoms of tin
$K_3$ is the gram atomic weight of the halogen
$M_{Sn}$ is the moles of tin contained in the composite per 100 g. of composite
SA is the surface area of the carrier material in $M^2$/g.

A second embodiment involves a superactive acidic bimetallic catalytic composite comprising a combination of a platinum component, a tin component, and a computed amount of a chloride component with an/alumina carrier material. The metallic components are present in amounts sufficient to result in the composite containing, on an elemental basis, about 0.05 to about 1 wt.% of the platinum group metal and about 0.1 to about 1 wt.% tin. The amount of chloride component is defined by the equation given in the first embodiment when $K_3 = 35.45$. Moreover, the tin component is uniformly distributed throughout the alumina carrier material in a particle size having a maximum dimension of less than 100° A, and the oxidation states of the metallic components are adjusted so that substantially all of the platinum component is present as the elemental metal and substantially all of the tin component is present in an oxidation state above that of the elemental metal in the form of a tin chloride or a tin oxychloride complex.

A third embodiment relates to a catalytic composite comprising a combination of the catalytic composite defined above in the first embodiment with a sulfur component in an amount sufficient to incorporate about 0.05 to about 0.5 wt.% sulfur, calculated on an elemental sulfur basis.

Another embodiment is a catalyst as defined in the first embodiment above wherein the halogen component is combined chloride and $K_3$ is 35.45.

Yet another embodiment involves a catalyst as defined above in the first embodiment wherein the tin component is present as a tin halide or tin oxyhalide complex.

Other objects and embodiments of the present invention relate to additional details regarding preferred catalytic ingredients, amounts of ingredients, suitable methods of composite preparation, operating conditions for use in the hydrocarbon conversion processes, and the like particulars. These are hereinafter given in the following detailed discussion of each of these facets of the present invention.

The superactive bimetallic catalyst of the present invention comprises a porous carrier material or support having combined therewith (1) catalytically effective amounts of a platinum group component and a tin component and (2) a computed amount of a halogen component. Considering first the porous carrier material utilized in the present invention, it is preferred that the material be a porous, adsorptive, high surface area support having a surface area of about 25 to about 500 m$^2$/g. The porous carrier material should be relatively refractory to the conditions utilized in the hydrocarbon conversion process, and it is intended to include within the scope of the present invention carrier materials which have traditionally been utilized in dual-function hydrocarbon conversion catalyst such as: (1) activated carbon, coke, or charcoal; (2) silica or silica gel, clays, and silicates including those synthetically prepared and naturally occurring, which may or may not be acid treated; for example, attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silicamagnesia, chromia-alumina, alumina-boria, silica-zirconia, etc.; (5) zeolitic crystalline aluminosilicates such as naturally occurring or synthetically prepared mordenite and/or faujasite, either in the hydrogen form or in a form which has been treated with multivalent cations; and, (6) combinations of one or more elements from one or more of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g/cc and surface area characteristics such that the average pore diameter is about 20 to 300 Angstoms, the pore volume is about 0.1 to about 1 cc/g and the surface area is about 100 to about 500m$^2$/g. In general, best results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 cc/g, and a surface area of about 175 to about 225 m$^2$/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina or commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at relatively low temperature of about 300° F. to about 400° F. and subjected to a calcination procedure at a temperature of about 850° F. to about 1300° for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the superactive composite of the present invention is a tin component, and it is an essential feature of the present invention that substantially all of the tin component in the composite is in an oxidation state above that of the elemental metal. That is, it is believed that best results are obtained when substantially all of the tin component exists in the catalytic composite in the +2 or +4 oxidation state. Accordingly, the tin component will be present in the composite as a chemical compound such as the oxide, sulfide, halide, oxyhalide, oxysulfide, and the like wherein the tin moiety is in a positive oxidation state, or in chemical combination with the carrier material in a manner such that the tin component is in a positive oxidation state. Controlled reduction experiments with the catalytic composites produced by the preferred methods of preparing the instant catalytic composite have established that the tin component in these catalysts is in a positive oxidation state and is not reduced by contact with hydrogen at temperatures in the range of 1000 to 1200° F. It is important to note that this limitation on the oxidation state of the tin component requires extreme care in preparation and use of the present catalyst to insure that it is not subjected to a reducing atmosphere at temperatures above 1200° F. Equally significant is my observation that it is only when the tin component is in a uniformly dispersed state in the carrier material that it has the capability to maintain its positive oxidation state when subjected to hereinafter described prereduction step. Stated another way, if the tin component is no properly dispersed on the support it can be reduced in the prereduction step and result in an inferior catalyst. Based on the evidence currently available it is believed that best results are obtained when the tin component is present in the instant superactive catalyst in the form of a tin halide or tin oxyhalide complex. The terms "tin halide" or "tin oxyhalide" as used herein refers to a coordinated tin-halide complex or tin-oxygen-halide complex which is not necessarily stoichiometric.

Interrelated with this oxidation state limitation are the factors of dispersion of the tin component in the support and of particle size of the tin component. This interrelationship emanates from my observation that it is only when the tin component is uniformly dispersed throughout the carrier material in a particle size having a maximum dimension less than 100 Angstroms that it can successfully maintain its preferred oxidation state when it is subjected to a high temperature prereduction treatment as hereinafter described. Thus it is an essential feature of my invention that the catalytic composite is prepared in a manner selected to meet the stated particle size and uniform dispersion limitations. By the use of the expression "uniform dispersion of the tin component in the carrier material" it is intended to describe the situation where the concentration of the tin ingredient is approximately the same in any reasonably divisable portion of the carrier material. Similarly, the expression "particles having a maximum dimension less than 100° A" is intended to denote particles that would pass through a sieve having a 100° A mesh size if it were possible to make such a sieve.

The tin component may be incorporated into the catalytic composite in any suitable manner known to effectively disperse this component throughout the carrier material in the required particle size. Thus this component may be added to the carrier by a coprecipitation or cogellation of a suitable soluble tin salt with the carrier material, by ion-exchange of suitable tin ions with ions contained in the carrier material when the ion exchange sites are uniformly distributed throughout the carrier, or controlled impregnation of the carrier material with a suitable soluble tin salt under conditions selected to result in penetration of all sections of the carrier material by the tin component. One preferred method of incorporating the tin component involves coprecipitating it during the preparation of the preferred carrier material, alumina. This method typically involves the addition of a suitable soluble tin compound such as stannous or stannic chloride to an alumina hydrosol, mixing these ingredients to obtain a uniform distribution of the tin moiety throughout the sol and then combining the hydrosol with a suitable gelling agent and dropping the resulting mixture into an oil bath etc., as explained in detail hereinbefore. After drying and calcining the resulting gelled carrier material there is obtained an intimate combination of alumina and tin oxide having the required dispersion and particle size. Another preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound and to hold the tin moiety in solution until it is evenly distributed throughout the carrier material and is preferably an aqueous, rather strongly acidic solution. Thus the tin component may be added to the carrier material by commingling the latter with an aqueous, acidic solution of a suitable tin salt or suitable compound of tin such as stannous bromide, stannous chloride, stannic chloride, stannic chloride pentahydrate, stannic chloride diamine, stannic trichloride bromide, stannic chromate, stannous fluoride, stannic fluoride, stannic iodide, stannic sulfate, stannic tartrate and the like compounds. The acid used in the impregnation solution may be any organic or inorganic acid that is capable of maintaining the pH of the impregnation solution in the range of about −1 or less to about 3 and preferably less than 1 during the impregnation step and that does not contaminate the resultant catalyst. Suitable acids are: inorganic acids such as hydrochloric acid, nitric acid, and the like; and strongly acidic organic acids such as oxalic acid, malonic acid, citric acid and the like. A particularly preferred impregnation solution comprises stannic or stannous chloride dissolved in a hydrochloric acid solution containing HCl in an amount corresponding to at least about 5 wt. % of the carrier material which is to be impregnated. Another useful impregnation solution is stannous or stannic chloride dissolved in anhydrous alcohol such as ethanol. In general, the tin component can be incorporated either prior to, simultaneously with, or after the platinum group component is added to the carrier material. However, I have found that excellent results are obtained when the tin component is incorporated simultaneously with the platinum group component. In fact, I have determined that a preferred aqueous impregnation solution contains chloroplatinic acid, a relatively high amount of hydrogen chloride, and stannic or stannous chloride.

Regardless of which tin compound is used in the preferred impregnation step, it is essential that the tin component be uniformly distributed throughout the carrier material. In order to achieve this objective with an aqueous impregnation solution it is necessary to dilute the impregnation solution to a volume which is approximately equal or substantially in excess of the volume of the carrier material which is impregnated and to add a relatively strong acid such as hydrochloric acid, nitric acid and the like to the impregnation solution in an amount calculated to maintain the pH of the impregnation solution in a range of about −1 or less to about 3, preferably less than 1. It is preferred to use a volume ratio of impregnation solution to carrier material of at least 0.5:1 and preferably about 1:1 to about 10:1 or more. Similarly, it is preferred to use a relatively long contact time during the impregnation step ranging from about ¼ hour up to about ½ hour or more before drying to remove excess solvent in order to insure a high dispersion of the tin component into the carrier material. The carrier material is, likewise, preferably constantly agitated during this preferred impregnation step.

This superactive bimetallic catalyst also contains a platinum group component. Although the process of the present invention is specifically directed to the use of a catalytic composite containing platinum, it is intended to include other platinum group metals such as palladium, rhodium, ruthernium, osmium and mixtures thereof. It is an essential feature of the present invention that substantially all of the platinum group component is present in the final catalyst in the elemental metallic state. The hereinafter described prereduction step is designed to accomplish this objective. Generally, the amount of the platinum group component present in the final catalyst composite is small compared to the quantities of the other components combined therewith. In fact, the platinum group component generally comprises about 0.01 to about 2 wt. % of the final catalytic composite, calculated on an elemental basis. Excellent results are obtained when the catalyst contains about 0.05 to about 1 wt. % of the platinum group metal. The preferred platinum group component is platinum metal, although good results are also obtained when it is palladium metal or iridium metal.

The platinum group component may be incorporated in the catalytic composite in any suitable manner such as coprecipitation or cogellation with the preferred carrier material, or ion exchange or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic or chloropalladic acid. Other water-soluble compounds of platinum group metals may be employed in impregnation solutions and include ammonium chloroplatinate, bromoplatinic acid, platinum dichloride, tetramine platinous chloride, platinum tetrachloride hydrate, platinum dichlorocarbonyldichloride, dinitrodiaminoplatinum, palladium dichloride, palladium nitrate, palladium sulfate, etc. The utilization of a platinum group compound containing halogen, such an chloroplatinic or chloropalladic acid, is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and to aid in the distribution of the platinum group component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Another essential constituent of the superactive bimetallic catalyst is a halogen component. The halogen utilized for this purpose may be either fluorine, chlorine, iodine, bromine or mixtures thereof, with fluorine and especially chlorine, being preferred for purposes of the present invention. In fact, as will be shown in the examples, best results are obtained when substantially all of the halogen component is furnished by chlorine. In accordance with the present invention it is necessary to differentiate between halogen combined with the support or carrier material and halogen associated with the metal moieties of the instant catalyst. As mentioned hereinbefore, I have found that there are two separate mechanisms for halogen interaction with the instant catalyst. More specifically, my experiments with platinum-tin bimetallic catalytic composites have led me to the conclusion that there are two separate kinds of halogen sites in this catalyst and that greatly improved performance is obtained when halogen component is combined with the catalyst in an amount sufficient to activate both types of halogen sites in the catalyst. One type of halogen site is ascribed to the traditional interaction of reactive halogen with reactable constituents of the carrier material (such as bound hydroxyl groups on the surface of the substrate) in order to form a halide complex on the surface of the carrier material. Although the precise form of the chemistry of the association of halogen with the carrier material in order to form this first type of site is not known with great precision, it is customary in the hydrocarbon conversion art to refer to this type of halogen as being combined with the carrier material in the form of the halide — for example, combined chloride or fluoride. In harmony with the teachings of the prior art in regards to this first type of halide site, I have ascertained that the amount of halogen necessary to satisfy this mode of halogen acquisition is predominantly a function of the available surface area of the carrier material utilized. Quite surprisingly, for the platinum-tin type of bimetallic catalyst of present interest, I have now discovered that there is a second and more important mechanism of halogen interaction with the catalyst and my experimental activities have allowed me to deduce that this second mode of interaction most likely involves the formation of a tin halide or tin oxyhalide complex in this catalyst. The existance of this second type of halide site on the catalyst is demonstrated by the fact that for a platinum-tin catalyst increasing the halide content above and beyond the normal requirements for formation of the first type of halide site mentioned above does not result in a substantial increase in acid characteristics of the resultant catalyst as one would expect from the teachings of the prior art in regard to the effect of halide levels on the acidity characteristic of a platinum-containing catalyst. As is demonstrated in the examples, my basic finding with regard to this second type of halide site is that it is necessary to provide sufficient halogen component to satisfy the first mode of halogen acquisition before the requirements of the second mode of addition can be met. In contrast to the dependence of the first type of halide sites on the surface area of the carrier material, I have now discerned that the amount of halogen required to satisfy this second mode of halide acquisition for a platinum-tin type of catalyst is a strong function of the moles of tin contained in the catalyst as will be hereinafter explained. Thus the distinguishing characteristic of the present superactive bimetallic catalyst is that the amount of halogen contained therein is sufficient to activate both modes of halogen acquisition. The quantitative amount of halogen necessary to satisfy both types of halogen sites in the catalyst is perhaps best defined in terms of the following equation:

$$\text{wt. \% Halogen} = (k_1)(SA) + (K_2)(K_3)(M_{Sn})$$

In this equation "$K_1$" is about 0.004 to about 0.006 wt. % halogen per $M^2/g$, with best results typically obtained when $K_1$ is about 0.005 wt. % halogen per $m^2/g$. "$K_2$" is about 3 to about 5 atoms of halogen per atom of tin with best results ordinarily obtained when $K_2$ is approximately 4. "$K_3$" is the atomic weight of the halogen used in the formulation of the instant catalyst and although mixtures of halogen can be used with appropriate modifications of the equation, it is most preferred to use only one type of halogen to satisfy the halide requirements of the present catalyst. In fact, superior results are obtained when the halide component of the present catalyst is exclusively supplied by only one kind of halogen with chlorine being much preferred. "$M_{Sn}$" is defined to be the mole of tin contained in the catalytic composite per 100 g. of composite and is computed by dividing the wt. % of tin contained in the catalyst by the atomic weight of time which is 118.7. Lastly, "SA" is the surface area of the carrier material expressed in $m^2/g$.

The halogen component can be added to the catalyst in any suitable manner which will satisfy the requirements for both types of halide sites. The portion of the halogen component assoicated with the carrier material can be added to the carrier material during preparation of the carrier material or before or after the addition of the other components. For example, halogen necessary to satisfy the requirements of the carrier material may be added at any stage of the preparation of the carrier material or to the calcined carrier material as an aqueous solution of a suitable water-soluble halide-producing compound such as hydrogen chloride, hydrogen fluoride, hydrogen bromide, ammonium chloride and the like compounds. The carrier material halide sites or a portion thereof may be produce during the impregnation of the carrier material with the metal moieties: for example, through the utilization of chloroplatinic acid and hydrogen chloride. Likewise, the alumina hydrosol which is typically utilized to form the preferred carrier material may contain sufficient halogen to satisfy at least a portion of the carrier material halide sites. The tin halide sites can be activated by any known method of halogen addition to the catalyst once the requirements of the carrier halide sites are satisfied, provided of course that the catalyst already contains the tin component. Although it is possible to add the tin halide sites simultaneously with the tin component to the present catalyst by means of an impregnation with a suitable tin halide compound, the preferred practice is to oxidize the tin-containing carrier material after incorporation of the tin component in order to properly fix the tin moiety in the carrier material. This oxidation step is believed to result in the decomposition or oxidation of the tin moiety with the resulting formation of the corresponding tin oxide. Therefore it is most preferred to form the tin halide sites on the surface of the instant catalyst after the metallic ingredients have been added thereto and after the resulting catalyst has been oxidized to the point where substantially all of the metal moieties are present in the form of the corresponding metallic oxides. The tin halide sites can then be produced in the catalyst by means of a halogenation step comprising subjecting the catalyst to treatment with a gas stream containing a halide-producing substance at conditions designed to incorporate sufficient halogen to satisfy both modes of halide acquisition. Specifically, the preferred procedure is to contact the oxidized platinum group metal- and tin-containing carrier material with a gas stream containing a halide-producing substance such as hydrogen halide, halogen and the like at conditions selected to cause interaction between the halogen component of the gas stream and the catalyst, preferably at a temperature of about 700° F. to about 1200° F. and in the presence of water. It is most preferred to use a gas stream containing water and hydrogen halide or its equivalent in a mole ratio of water to hydrogen halide of about 5:1 to about 20:1, with best results obtained with a mole ratio of about 8:1 to about 5:1. Superior results are obtained when substantially all of the halogen component is combined chloride and when hydrogen chloride is used in the halogenation step.

Regarding the amount of the tin component contained in the superactive composite, it is preferably sufficient to constitute about 0.01 to about 5 wt. % of the final composite, calculated on an elemental basis, although substantially higher amounts of tin may be utilized in some cases. Best results are typically obtained with about 0.1 to about 1 wt. % tin. Irrespective of the absolute amounts of the tin component and the platinum group component utilized, the atomic ratio of tin to the platinum group metal contained in the bimetallic catalyst is preferably selected from the range of about 0.1:1 to about 3:1, with best results achieved at an atomic ratio of about 0.5:1 to 1.5:1. This is particularly true when the total content of the tin component plus the platinum group component in the catalytic composite is fixed in the range of about 0.15 to about 2 wt. % thereof, calculated on an elemental tin and platinum group metal basis.

An optional ingredient for the superactive catalyst of the present invention is a Friedel-Crafts metal halide component. This ingredient is particularly useful in hydrocarbon conversion embodiments of the present invention wherein it is preferred that the catalyst utilized have a strong acid or cracking function associated therewith — for example, an embodiment where hydrocarbons are to be hydrocracked or isomerized with the catalyst of the present invention. Suitable metal halides of the Friedel-Crafts type include aluminum chloride, aluminum bromide, ferric chloride, ferric bromide, tin chloride, zinc chloride, and the like compounds, with the aluminum halides, particularly aluminum chloride, ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. % of the carrier material generally being preferred.

Regardless of the details of how the components of the superactive bimetallic catalyst are combined with the porous carrier material, the final catalyst generally will be dried at a temperature of about 200° to about 600° F. for a period of about 2 to about 24 hours or more, and finally calcined or oxidized at a temperature of about 700° F. to about 1100° F. in an air atmosphere for a period of at least about 0.5 to about 10 hours in order to convert substantially all of the metallic components to the oxide form. Best results are generally obtained as explained hereinbefore when the halogen content of the catalyst is adjusted during at least a portion of this oxidation step by including a halogen or a halogen-containing compound in the air atmosphere utilized. In particular, when the halogen component of the catalyst is combined chloride, it is preferred to use a mole ratio of $H_2O$ to HCl of about 5:1 to about 20:1 during at least a portion of the oxidation step in order to adjust the final chlorine content of the catalyst to the value hereinbefore specified.

It is essential that the resultant oxidized catalytic composite be subjected to a reduction step with a substantially water-free reduction agent prior to its use in the conversion of hydrocarbons. This step is designed to selectively reduce the platinum component and to insure a uniform and finely divided dispersion of the metallic components throughout the carrier material. Preferably, substantially pure and dry hydrogen (i.e., less than 20 vol. ppm. $H_2O$) is used as the reducing agent in this step. A stream of the reducing agent is contacted with the oxidized catalyst at conditions, including a temperature of about 600° F. to about 1200° F., a gas hourly space velocity of about 100 to about 1000 or more hr.$^{-1}$, and for a period of about 0.5 to 10 hours, selected to reduce substantially all of the platinum component to the metallic state while maintaining substantially all of the tin component in an oxidized state. This reduction step may be performed in situ as part of a startup sequence if precautions are taken to predry the plant to a substantially water-free state and if substantially water-free hydrogen is used. Preferably at least the initial portion of the reduction is done slowly (i.e. at lower temperatures) in order to minimize the adverse effects of the water formed by the reduction reaction.

The resulting reduced catalytic composite may, in some cases, be beneficially subjected to a presulfiding step designed to incorporate in the catalytic composite from about 0.05 to about 0.5 wt. % sulfur calculated on an elemental basis. Preferably, this presulfiding treatment takes place in the presence of hydrogen and a suitable decomposable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide containing about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a hydrocarbon charge stock and hydrogen are contacted with the superactive bimetallic catalyst described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

In the case where the superactive bimetallic catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha — for example, a naphtha boiling in the range of $C_7$ to 400° F. In some cases, it is also advantageous to charge pure hydrocarbons or mixtures of hydrocarbons that have been extracted from hydrocarbon distillates — for example, straight chain paraffins — which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in typical isomerization embodiments, the charge stock can be a paraffinic stock rich in $C_4$ to $C_8$ normal paraffins, or a normal butane-rich stock, or an n-hexane-rich stock, or a mixture of alkylaromatics such as mixtures of xylenes, etc. In dehydrogenation, the charge stock can be any dehydrogenatable hydrocarbon. In hydrocracking embodiments, the charge stock will be typically a gas oil, heavy cracked cycle oil, etc. Likewise, pure hydrocarbons or substantially pure hydrocarbons can be converted to more valuable products by using the superactive bimetallic catalyst of the present invention in any of the hydrocarbon conversion processes known to the art that use a dual-function catalyst.

In a reforming embodiment it is generally preferred to utilize the novel bimetallic catalyst in a reaction environment in which the amount of water present therein is held to carefully controlled levels. Essential to the achievement of this objective is the control of the amount of water, or its equivalent, present in the charge stock and the hydrocarbon stream which are passed to the reforming zone. Best results are ordinarily obtained when the total amount of water or water-producing compounds entering the reforming zone from any source is held to a level in the range corresponding to about 1 to about 20 wt. ppm., expressed as weight of equivalent water in the charge stock. When the amount of water entering this zone is above this preferred range, a significant reduction in water level can be accomplished by careful control of the water present in the charge stock and/or in the hydrogen stream. The charge stock and/or the hydrogen stream can be dried by using any suitable drying means known to those skilled in the art such as conventional solid adsorbents having a high selectivity for water; for instance, sodium or calcium crystalline aluminosilicate, silica gel, activated alumina, molecular sieves, anhydrous calcium sulfate, high surface area sodium, and the like adsorbents. Similarly, the water content of the charge stock may be adjusted by a conventional water-stripping operation in a fractioning column or like devices. And, in some cases, a combination of adsorbent drying and distillation drying may be beneficially used to effect almost complete removal of water from the charge stock. In the case where the total amount of water or water-producing substance entering the reforming zone is below the desired range, the required amount of water can be achieved by introducing into the reforming zone in any manner a suitable water additive such as water per se or an oxygen-containing substance that is reducible to water at catalytic reforming conditions. Typical oxygen-containing reducible compounds that may be utilized are the alcohols, the aldehydes, the ketones and the like.

In the reforming embodiment, an effluent stream is withdrawn from the reforming zone and passed through a cooling means to a separation zone, typically maintained at about 25 to 150° F. wherein a hydrogen-rich gas is separated from a high octane liquid product, commonly called an unstabilized reformate. This hydrogen-rich gas is withdrawn from the separating zone, and when the water level in the reforming zone is too high, at least a portion thereof passed through an adsorption zone containing an adsorbent selective for water. A major portion of this hydrogen-rich gas stream, plus the dried hydrogen stream when drying is used, is then recycled through suitable compressing means back to the reforming zone. The liquid phase from the separating zone is then typically withdrawn and commonly treated in a fractionating system in order to adjust its butane concentration in order to control front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° to about 1000° F. and preferably about 75° to about 600° F.; a pressure of atmospheric to about 100 atmospheres; hydrogen to hydrocarbon mole ratio of about 0.5 to about 20:1 and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700° to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 psig. to about 3000 psig.; a temperature of about 400° F. to about 900° F.; an LHSV of about 0.1 hr.$^{-1}$ to about 10 hr.$^{-1}$, and hydrogen circulation rates of about 1,000 to 10,000 SCF per barrel of charge.

In the reforming embodiment of the present invention, the pressure utilized is preferably selected in the range of about 0 psig. to about 1000 psig., with best results obtained at about 50 to about 350 psig. In fact, it is a singular advantage of the present invention that it allows stable operation at lower pressures than have heretofore been successfully utilized in so-called "continuous" reforming systems (i.e., reforming for periods of about 15 to about 200 or more barrels of charge per pound of catalyst without regeneration). In other words, the superactive bimetallic catalyst of the present invention allows the operation of a continuous reforming system to be conducted at lower pressure (i.e., 50 to 350 psig.) for about the same or better catalyst life before regeneration as has been heretofore realized with conventional catalysts at higher pressures (i.e., 400 to 600 psig.).

Similarly, the temperature required for reforming is significantly lower than that required for a similar reforming operation using a high quality platinum-containing catalyst of the prior art. This significant and desirable feature of the present invention is a consequence of the selectivity of the superactive catalyst of the present invention for the octane-upgrading reactions that are preferably induced in a typical reforming operation. Hence, the present invention requires a temperature in the range of from about 700° F. to about 1100° F. and preferably about 800° F. to about 1050° F. As is well known to those skilled in the continuous reforming art, the initial selection of the temperature within this broad range is made primarily as a function of the desired octane of the product reformate considering the charcteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for the superactive bimetallic catalyst of the present invention than for a high quality reforming catalyst which is manufactured in exactly the same manner as the catalyst of the present invention except for the inclusion of the tin component and the computed halogen component. Moreover, for the catalyst of the present invention, the $C_5$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$ with a value in the range of about 1 to about 5 hr.$^{-1}$ being preferred. In fact, it is a feature of the present invention that, for the same severity level, it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalyst at no sacrifice in catalyst life before regeneration.

The following examples are given to illustrate further the preparation of the superactive catalytic composite of the present invention and the use thereof in the conversion of hydrocarbons. It is understood that the examples are intended to be illustrative and not restrictive.

EXAMPLE I

This example demonstrates the preferred method of preparing the superactive bimetallic catalytic composite of the present invention.

A tin-containing alumina carrier material comprising 1/16 inch spheres was prepared by: forming an aluminum hydroxyl chloride sol by dissolving substantially pure aluminum pellets in a hydrochloric acid solution, adding stannic chloride to the resulting sol in an amount selected to result in a finished catalyst containing about 0.5 wt. % tin, vigorously stirring the resulting solution in order to evenly distribute the tin component throughout the resulting solution, adding hexamethylenetetramine to the resulting tin-containing alumina sol, gelling the resulting solution by dropping same in particle form into an oil bath at conditions selected to form spherical particles of alumina- and tin-containing hydrogel. The resulting particles of hydrogen were then aged, washed, dried and calcined to form spherical particles of gamma-alumina containing a uniform dispersion of about 0.5 wt. % tin in the form of tin oxide and about 0.3 wt. % combined chloride. Additional data as to this method of preparing the preferred gamma-alumina carrier material are given in the teachings of U.S. Pat. No. 2,620,314.

An aqueous impregnation solution containing chloroplatinic acid and hydrogen chloride was then prepared. The tin containing alumina carrier material was thereafter admixed with the impregnation solution. The amount of the reagents contained in this impregnation solution was calculated to result in a final catalyst containing, on an elemental basis, about 0.6 wt. % platinum. In order to insure uniform dispersion of the platinum component throughout the carrier material, the amount of hydrogen chloride was about 3 wt. % of the alumina particles. The impregnation step was performed by adding the carrier material particles to the impregnation mixture with constant agitation. In addition, the volume of the impregnation solution was approximately the same as the volume of the carrier material particles. The impregnation mixture was maintained in contact with the carrier material particles for a period of about ½ hour at a temperature of about 70° F. Thereafter, the temperature of the mixture of the impregnation solution and the catalyst particles was raised to about 225° F. and the excess impregnation solution was evaporated in a period of about ½ hour. The treated particles were then subjected to an oxidation and calcination step in an air atmosphere of about 975° F. for about 1 hour. The calcination step was designed to convert substantially all of the platinum component to the corresponding metallic oxide. In order to activate both modes of halogen acquisition, the resultant calcined spheres were then subjected to a halogenation procedure which involves contacting them with an air stream containing $H_2O$ and HCl in order to produce a catalyst containing a halogen component in an amount sufficient to activate both types of halide sites mentioned hereinbefore. The amount of halogen necessary to achieve this result was computed according to the following procedure. For this particular catalyst, the surface area of the carrier material was 202 $m^2$/g, the apparent bulk density was 0.598 g/cc, and the tin content was 0.482 wt. %. Accordingly, the quantitative relationship for halogen previously disclosed required that the amount of halogen satisfy the following relationship:

wt. % Halogen = $(202)(K_1)$ + $(K_2)(35.4)(0.482/118.7)$ and since it was desired to utilize the preferred values for the $K_1$ and $K_2$ parameters, these were set at 0.005 and 4 respectively with a result that the wt. % halogen required by the analytical relationship of the present invention was computed to be 1.58 wt. % chloride with about 1 wt. % of the chloride being necessary to satisfy the carrier material halide sites and 0.58 wt. % being used to satisfy the requirement of the tin halide sites. Conditions used in this halogenation step were thus selected to result in a catalyst containing about 1.58 wt. % chloride. The conditions utilized were a mole ratio of $H_2O$ to HCl of 10:1, a temperature of 975° F. and a contact time of about 4 hours.

The reulting catalyst particles was then analyzed and found to contain, on an elemental basis, about 0.617 wt.% platinum, 0.482 wt.% tin and about 1.58 wt.% chloride. For this catalyst the atomic ratio of tin to platinum was about 1.28:1; the atomic ratio of chloride to tin was about 10.9:1 and the atomic ratio of chloride to platinum was about 14.1:1.

Thereafter the catalyst particles were subjected to a dry prereduction treatment designed to reduce the platinum component to the elemental state wherein maintaining substantially all of the tin component in a positive oxidation state. This dry prereduction step essentially involves contacting the halogenated catalyst particles for about 1 hour with a substantially pure hydrogen stream containing less than about 5 vol. ppm. water at a temperature of about 1050° F.; a pressure slightly above atmospheric and a flow rate of hydrogen through the plant corresponding to a gas hourly space velocity of 720 $hr.^{-1}$. The resulting catalyst is hereinafter referred to as catalyst "A".

EXAMPLE II

In order to compare the superactive bimetallic catalytic composite of the present invention with a superior bimetallic catalytic composite made according to the teachings of my prior U.S. Pat. No. 3,745,112 in a manner calculated to bring out the beneficial interaction of the additional halide with a superior platinum-tin bimetallic catalyst, a comparison test was made between the superactive bimetallic catalyst of the present invention which was prepared in Example I (catalyst "A") and a platinum-tin bimetallic catalyst which only has sufficient halogen component to satisfy the requirements of the carrier material halide sites. The control catalyst was a combination of a platinum component, a tin component and a chloride component with a gamma-alumina carrier material in an amount sufficient to result in a final catalyst containing about 0.6 wt. % platinum, about 0.532 wt. % tin and about 1.13 wt. % chloride. This control catalyst is hereinafter referred to as catalyst "B". Catalyst "B" was prepared by a method analogous to that set forth in Example I except that the additional mode of halogen addition was not activated due to the fact that conditions were adjusted in the halogenation step to result in a conventional amount of chloride component instead of the amount necessary to satisfy the quantitative relationship mandated by the present invention. Specifically, the halogenation step was conducted at a mole ratio of water to hydrogen chloride of about 30:1 instead of the much more severe 10:1 utilized to prepare the catalyst of the present invention. The control catalyst had a surface area of about 200 $m^2$/g and an apparent bulk density of about 0.592 g/cc. The tin to platinum atomic ratio for the control catalyst was 1.45:1; the chloride to tin atomic ratio was 7.1:1; and the chloride to platinum atomic ratio was 10.4:1. Since the requirements of the halide sites on the carrier for a carrier having a surface area of about 200 $m^2$/g is approximately 1 wt. %, it can be seen that the control catalyst did not have sufficient excess halide sites to fully activate the additional chloride sites of concern to the present invention.

Catalyst "A" and catalyst "B" were then separately subjected to a high stress accelerated catalytic reforming evaluation test designed to simulate conditions encountered in a commercial catalyst reforming process and to emphasize their relative activity, selectivity and stability characteristics. Since catalyst composition differences were to be evaluated, the test procedure involved a relatively long term activity-stability test. The test essentially was a process for reforming a relatively low-octane gasoline fraction in a long term activity-stability operation wherein the conditions utilized ordinarily result in a catalyst life of about 3 to 6 or more barrels of charge per pound of catalyst (BPP). In both tests the same charge stock was utilized and it's pertinent characteristics are given in Table I. It is to be noted, in both cases the tests were conducted under substantially water-free conditions with the only substantial source of water entering the reforming zone being the approximately 3 wt. ppm. water contained in the charge stock. Likewise, it is to be observed that both runs were performed under substantially sulfur-free conditions with the only sulfur input into the stream being the 0.1 wt. % sulfur contained in the charge stock.

TABLE I

| Analysis of Mid-Continent Naphtha | |
|---|---|
| Gravity, °API at 60° F. | 54.3 |
| Distillation Profile, ° F. | |
| Initial Boiling Point | 217 |
| 5% Boiling Point | — |
| 10% Boiling Point | 229 |
| 30% Boiling Point | 244 |
| 50% Boiling Point | 262 |
| 70% Boiling Point | 290 |
| 90% Boiling Point | 324 |
| 95% Boiling Point | 336 |
| End Boiling Point | 356 |
| Chloride, wt. ppm. | 0.2 |
| Nitrogen, wt. ppm. | 0.3 |
| Water, wt. ppm. | 3 |
| Octane Number, F-1 Clear | 53.6 |
| Paraffin, vol.% | 45.5 |
| Naphthenes, vol. % | 41.1 |
| Aromatics, vol. % | 13.4 |

This accelerated activity-stability catalytic reforming test was specifically designed to determine whether the catalyst being evaluated has superior characteristics for use in a high severity low-pressure reforming operation wherein the expected catalyst life was designed to be a representative fraction that would be encountered in actual commercial operations. The run consisted of a series of evaluation periods of approximately 72 hours each comprising a series of weight check periods and test periods during which the products from the reforming zone were collected and analyzed. Both test runs were performed at identical conditions which comprised a liquid hourly space velocity of 2.0 hr.$^{-1}$; a reactor outlet pressure of 125 psig.; a gas to oil mole ratio of 4:1; a recycle gas water level of 4 to 8 mole ppm. and an inlet reactor temperature which was continuously adjusted throughout the test to achieve and maintain target octane level of the $C_5+$ reformate product of 100 F-1 clear.

Both tests were performed in a pilot plant scale reforming plant comprising a reactor containing the catalyst being evaluated, a hydrogen separation zone and a debutanizer column and suitable heating means, pumping means, condensing means, compressing means and like conventional equipment. The flow scheme utilized in the plant involves commingling a hydrogen recycle stream with the charge stock in an amount sufficient to result in a gas to oil mole ratio of about 4:1 and heating the resulting mixture to the required reforming reactor inlet temperature. The heated mixture is then passed downflow into a reactor containing the subject catalyst as a fixed bed. An effluent stream is then withdrawn from the bottom of the reactor, cooled to about 70° F. and passed to a gas-liquid separating zone wherein a hydrogen-rich gaseous phase is allowed to separate from a liquid hydrocarbon phase. A portion of the gaseous phase is then continuously withdrawn from the separating zone and passed as necessary over a high surface area sodium scrubber in order to maintain the water content of same in the range of about 4 to 8 mole ppm. The resulting substantially water-free and sulfur-free hydrogen stream is then returned to the reactor as the hydrogen recycle stream. The excess gaseous phase from the separating zone is recovered as the hydrogen-containing product stream (commonly called "excess recycle gas"). The liquid phase from the separating zone is also withdrawn therefrom and passed to a debutanizer column wherein light ends (i.e. $C_1$ to $C_4$) are taken overhead as debutanizer overhead and a $C_5+$ reformate recovered as the principal bottom product. Results of the separate tests performed on the superactive catalyst of the present invention, catalyst "A", and the control catalyst, catalyst "B", are presented in Table II in terms of inlet temperature to the reactor in ° F. necessary to obtain target octane level and the amount of $C_5+$ reformate recovered expressed as vol. % of the charge stock. These results are shown in Table II as a function of time expressed in barrels of charge processed per pound of catalyst contained in the reactor. It is to be noted that the test was arbitrarily terminated when the inlet reactor temperature reached a temperature of 1000° F. which corresponded to the point where a commercial unit would most likely be shut down for catalyst regeneration. Therefore, the results for catalyst "B" are only shown out to a catalyst life corresponding to 7.7 barrels per pound which corresponds to an operating time of about 33 days.

TABLE II

| | Results of Accelerated Reforming Tests | | | |
|---|---|---|---|---|
| Time, | Catalyst "A" | | Catalyst "B" | |
| BPP | T, ° F. | $C_5+$, wt. % | T, ° F. | $C_5+$, wt.% |
| 0.5 | 900 | 84.5 | 917 | 83.9 |
| 1.0 | 902 | 84.5 | 925 | 83.8 |
| 1.5 | 908 | 84.6 | 930 | 83.7 |
| 2.0 | 912 | 84.4 | 934 | 83.7 |
| 2.5 | 916 | 84.2 | 938 | 83.6 |
| 3.0 | 919 | 83.6 | 942 | 83.6 |
| 3.5 | 925 | 83.5 | 946 | 83.5 |
| 4.0 | 930 | 83.2 | 951 | 83.5 |
| 4.5 | 937 | 83.6 | 956 | 83.4 |
| 5.0 | 939 | 83.5 | 960 | 83.4 |
| 5.5 | 939 | 83.4 | 966 | 83.4 |
| 6.0 | 943 | 83.2 | 971 | 83.2 |
| 6.5 | 947 | 83.0 | 977 | 83.0 |
| 7.0 | 950 | 83.0 | 986 | 82.7 |
| 7.5 | 952 | 83.4 | 996 | 82.0 |
| 8.0 | 957 | 83.1 | Shut-down at 7.7 BPP | |
| 8.5 | 963 | 83.0 | | |
| 9.0 | 967 | 82.7 | | |
| 9.5 | 972 | 82.5 | | |
| 10.0 | 980 | 81.6 | | |
| 10.5 | 985 | 81.6 | | |
| 11.0 | 990 | 81.6 | | |
| 11.5 | 997 | 81.0 | | |
| 11.7 | 1000 | — | | |

Referring now to the results of the comparison test in Table II it is evident that the effects of the additional halide component on the platinum-tin containing bimetallic catalyst is to substantially promote same and to enable catalyst "A" to substantially outperform catalyst "B" in the areas of activity, stability and catalyst life. That is, the data presented in Table II clearly indicates that the superactive bimetallic catalyst of the present invention is markedly superior to the control catalyst in a high severity reforming process which is run to accumulate a substantial period of time on the catalyst. As was pointed out in detail hereinbefore, an excellent measure of catalyst activity is the inlet temperature to the reactor which is required to maintain target octane. The data presented in Table II on this variable clearly shows that catalyst "A" was significantly more active than catalyst "B" throughout the test period. This activity advantage was approximately 20° F. or better throughout the duration of the test; for example, the period corresponding to 5 BPP, catalyst "A" only required an inlet reactor temperature of 939° F. in order to make octane, whereas catalyst "B" required a temperature of 960° F. for the same purpose. This consistent 20° F. or better temperature differential needed to make octane is conclusive evidence of the activity of a catalyst formulated according to the concept of the present invention to materially accelerate the rate of the reforming reaction in view of the well known rule of thumb that the rate of a reaction generally doubles for every 18° F. change in reactor temperature. Thus the data clearly shows that the superactive bimetallic catalyst of the present invention is approximately twice as active for the promotion of the beneficial upgrading reaction of catalytic reforming than the high quality control catalyst. However, activity is only one of the necessary characteristics needed in order for a catalyst to demonstrate superiority. Activity characteristics must be coupled with superior selectivity and stability characteristics in order to demonstrate improved performance. Selectivity is measured directly by $C_5+$ yield and the data presented in Table II clearly indicates that catalyst "A" consistently produced as good as, or better, $C_5+$ yields as catalyst "B" did at significantly higher temperatures. This result is greatly unexpected in view of the fact that the established relationship for activity-stability generally recognizes that decreased selectivity accompanies increased activity.

The last remaining characteristic of a good catalyst is associated with the rate of change of activity and selectivity parameters which as was explained hereinbefore, is commonly designated as stability. Good stability characteristics are demonstrated by looking at the rate of change of activity and selectivity parameters which in this particular case of interest here are measured by reactor temperature and $C_5+$ yield respectively. The data in Table II shows that the rate of change in temperature required to make octane for catalyst "A" was significantly better than that exhibited for catalyst "B". On the other hand, the incremental changes in $C_5+$ yield indicated in Table II clearly show superior selectivity-stability for catalyst "A". Good stability characteristics were also manifest in the fact that catalyst "A" was able to process approximately 11.6 BPP before reaching 1000° F. in reactor inlet temperature; in contrast, catalyst "B" was only able to process approximately 7.7 BPP before exceeding this limit at the conditions utilized. This life of catalyst "A" corresponds to a time period of 50 days of actual operation whereas the period of operation for catalyst "B" corresponds to 33 days of actual operation; this represents a 50% increase in catalyst life for the catalyst of the present invention. Another measure of good stability characteristics is the rate of carbon formation on the catalyst and on this basis, catalyst "A" accumulated carbon at a rate corresponding to 1.30 wt. % carbon per BPP whereas catalyst "B" accumulated carbon at a rate corresponding to 1.54 wt. % carbon per BPP. Thus, the rate of coke laydown on catalyst "A" was 15% less than that on catalyst "B".

In summary, it is clear from the data presented in Table II that the superactive bimetallic catalyst of the present invention is a significant advance over the improved bimetallic catalyst disclosed in my prior U.S. Pat. No. 3,745,112.

It is intended to cover by the following claims all changes and modifications of the above disclosure of the present invention which would be self-evident to a man of ordinary skill in the catalyst formulation art or the hydrocarbon conversion art.

I claim as my invention:

1. A process for converting a hydrocarbon which comprises contacting the hydrocarbon at hydrocarbon conversion conditions with a catalytic composite comprising a combination of a platinum group component, a tin component and a halogen component with a porous carrier material; werein the metallic components are present in amounts sufficient to result in the composite containing on an elemental basis, about 0.01 to about 2 wt. % platinum group metal and about 0.01 to about 5 wt. % tin; wherein the tin component is uniformly dispersed throughout the porous carrier material in a particle size which is less than 100 Angstroms in maximum dimension; wherein substantially all of the platinum group component is present as an elemental metal; wherein substantially all of the tin component is present in an oxidation state above that of the elemental metal; and wherein the amount of the halogen component, on an elemental basis, contained in the composite is defined by the following equation:

$$\text{wt.\% halogen} = (K_1)(SA) + (K_2)(K_3)(M_{Sn})$$

where
$K_1$ is about 0.004 to about 0.006 wt. % Halogen/$M^2$/g
$K_2$ is about 3 to about 5 atoms of halogen/atoms of tin
$K_3$ is the gram atomic weight of the halogen
$M_{Sn}$ is moles of tin contained in the composite per 100 g. of composite
SA is the surface area of the carrier material in $M^2$/g.

2. A process as defined in claim 1 wherein the platinum group component is platinum metal.

3. A process as defined in claim 1 wherein the platinum group component is palladium metal.

4. A process as defined in claim 1 wherein the porous carrier material is a refractory inorganic oxide.

5. A process as defined in claim 4 wherein the refractory inorganic oxide is alumina.

6. A process as defined in claim 1 wherein the halogen component is combined chloride.

7. A process as defined in claim 1 wherein the halogen component is combined fluoride.

8. A process as defined in claim 1 wherein the tin component is a tin halide or tin oxyhalide complex.

9. A process as defined in claim 1 wherein the catalytic composite contains a sulfur component in an amount sufficient to result in the composite containing about 0.05 to about 0.5 wt. % sulfur, calculated on an elemental basis.

10. A process as defined in claim 1 wherein the atomic ratio of tin to platinum group metal contained in the composite is selected from the range of about 0.1:1 to about 3:1.

11. A process as defined in claim 1 wherein the composite contains, on an elemental basis, about 0.05 to about 1 wt. % platinum group metal and about 0.1 to about 1 wt. % tin.

12. A process as defined in claim 1 wherein the platinum group component is platinum metal, wherein the tin component is a tin chloride or oxychloride, wherein the halogen component is combined chloride, wherein the porous carrier material consists essentially of gamma-alumina and wherein $K_1=0.005$, $K_2=3.75$ to $4.25$ and $K_3=35.5$.

13. A process as defined in claim 1 wherein the contacting of the hydrocarbon with the catalytic composite is performed in the presence of hydrogen.

14. A process as defined in claim 1 wherein the type of hydrocarbon conversion is catalytic reforming of a gasoline fraction to produce a high octane reformate, wherein the hydrocarbon is contained in the gasoline fraction, wherein the contacting is performed in the presence of hydrogen and wherein the hydrocarbon conversion conditions are reforming conditions.

15. A process as defined in claim 14 wherein the reforming conditions include a temperature of 700° to about 1100° F., a pressure to about 0 to about 1000 psig., a liquid hourly space velocity of 0.1 to about 10 hr.$^{-1}$, and a mole ratio of hydrogen to hydrocarbon of 1:1 to about 20:1.

16. A process as defined in claim 14 wherein the reforming conditions utilized include a pressure of about 50 to about 350 psig.

* * * * *